United States Patent
Lee et al.

(10) Patent No.: US 10,485,012 B2
(45) Date of Patent: Nov. 19, 2019

(54) METHOD FOR PERFORMING D2D OPERATION BY TERMINAL IN WIRELESS COMMUNICATION SYSTEM AND TERMINAL USING SAME METHOD

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/570,194

(22) PCT Filed: May 2, 2016

(86) PCT No.: PCT/KR2016/004620
§ 371 (c)(1),
(2) Date: Oct. 27, 2017

(87) PCT Pub. No.: WO2016/175639
PCT Pub. Date: Nov. 3, 2016

(65) Prior Publication Data
US 2018/0139769 A1    May 17, 2018

Related U.S. Application Data

(60) Provisional application No. 62/154,736, filed on Apr. 30, 2015.

(51) Int. Cl.
| | |
|---|---|
| H04W 4/00 | (2018.01) |
| H04W 72/12 | (2009.01) |
| H04W 72/04 | (2009.01) |
| H04W 72/06 | (2009.01) |
| H04W 72/14 | (2009.01) |
| H04W 72/10 | (2009.01) |

(52) U.S. Cl.
CPC ..... *H04W 72/1242* (2013.01); *H04W 72/048* (2013.01); *H04W 72/0453* (2013.01);
(Continued)

(58) Field of Classification Search
USPC ......................................... 370/331
See application file for complete search history.

(56) References Cited

U.S. PATENT DOCUMENTS 9,788,339 B2 * 10/2017 Park ................. H04W 72/10
2014/0056220 A1   2/2014 Poitau et al.
(Continued)

FOREIGN PATENT DOCUMENTS

| EP | 3101823 A1 | 12/2016 |
|---|---|---|
| WO | WO 2015/046973 A1 | 4/2015 |
| WO | WO 2015/115791 A1 | 8/2015 |

OTHER PUBLICATIONS

Ericsson, "Direct Discovery Transmission on Non-Serving Carriers", 3GPP TSG-RAN WG1 #80bis, R1-151764, Belgrade, Serbia, Apr. 20-24, 2015 (downloaded by EPO Apr. 19, 2015), 4 pages.
Intel Corporation, "Further Details of D2D TX/RX Behavior", 3GPP TSG RAN WG1 Meeting #80, R1-150233, Athens, Greece, Feb. 9-13, 2015, pp. 1-5.
(Continued)

*Primary Examiner* — Phuongchau Ba Nguyen
(74) *Attorney, Agent, or Firm* — Birch, Stewart, Kolasch & Birch, LLP

(57) ABSTRACT

The present invention provides a method for performing a device-to-device (D2D) operation by a terminal in a wireless communication system, the method comprising the steps of: determining priorities of a plurality of D2D operations when the plurality of D2D operations simultaneously occur on a plurality of carriers; and performing one D2D operation among the plurality of D2D operations, on the basis of the priorities, wherein the simultaneous occurrence of the plurality of D2D operations on the plurality of carriers comprises the simultaneous occurrence of the plurality of D2D operation on the plurality of carriers in the same time domain.

7 Claims, 18 Drawing Sheets

(52) U.S. Cl.
CPC ....... *H04W 72/06* (2013.01); *H04W 72/1247* (2013.01); *H04W 72/14* (2013.01); *H04W 72/10* (2013.01)

(56) References Cited

U.S. PATENT DOCUMENTS

2015/0043446 A1    2/2015  Tsirtsis et al.
2016/0066356 A1*  3/2016  Lindoff ............... H04W 52/383
                                                370/329

OTHER PUBLICATIONS

Qualcomm Incorporated, "Remaining issues for D2D", 3GPP TSG-RAN WG1 #79, R1-145222, San Francisco, USA, Nov. 17-21, 2014 (downloaded by EPO Nov. 19, 2014), 15 pages.
3GPP TS 36.300 V12.5.0 (Mar. 2015), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
3GPP TS 36.304 V8.5.0 (Mar. 2009), Technical Specification, 3rd Generation Partnership Project; Technical Specification Group Radio Access Network; Evolved Universal Terrestrial Radio Access (E-UTRA); User Equipment (UE) procedures in idle mode (Release 8).
Kyocera, "Priority handling for D2D discovery/communication during cell reselection", R2-144970, 3GPP TSG-RAN WG2 #88, San Francisco, USA, Nov. 17-21, 2014, 5 pgs.

\* cited by examiner

METHOD FOR PERFORMING D2D OPERATION BY TERMINAL IN WIRELESS COMMUNICATION SYSTEM AND TERMINAL USING SAME METHOD

CROSS REFERENCE TO RELATED APPLICATIONS

This application is the National Phase of PCT International Application No. PCT/KR2016/004620, filed on May 2, 2016, which claims priority under 35 U.S.C. 119(e) to U.S. Provisional Application No. 62/154,736, filed on Apr. 30, 2015, all of which are hereby expressly incorporated by reference into the present application.

BACKGROUND OF THE INVENTION

Field of the Invention

The present invention relates to wireless communication and, more particularly, to a method for performing a D2D operation performed by a terminal in a wireless communication system and a terminal using the method.

Related Art

In ITU-R (International Telecommunication Union Radio communication sector),
IMT (International Mobile Telecommunication)-Advanced standards, which is the next generation mobile communication system following the 3rd-generation system, is developed. The IMT-Advanced aims to support IP (Internet Protocol)-based multimedia services at data rates of 1 Gbps in a stationary and low speed state and 100 Mbps in a high speed state.

The 3GPP (3rd Generation Partnership Project) is preparing for the LTE-Advanced (LTE-A), which is an update of the LTE (Long Term Evolution) based on the OFDMA (Orthogonal Frequency Division Multiple Access)/SC-FDMA (Single Carrier-Frequency Division Multiple Access) transmission scheme, as the system standard satisfying requirements of the IMT-Advanced. The LTE-A is one of promising candidates for the IMT-Advanced.

Recently, there is a growing interest in the D2D (Device-to-Device) technology for direct communication between devices. In particular, D2D is getting attention as a communication technology for public safety networks. Although commercial communication networks are rapidly changing to the LTE system, current public safety networks mostly rely on the 2G technology because of issues of backward compatibility with existing communication standards and cost issues. These technology gaps and the needs for improved services lead to the efforts for improving the public safety networks.

Service requirements of public safety networks are more demanding (in terms of reliability and security) than commercial communication networks and also include direct signal transmission and reception between devices, namely D2D operation even when the devices are out of coverage of cellular communication or cellular communication is unavailable for them.

D2D operation has various advantages in terms of signal transmission and reception between devices in the vicinity of each other. For example, D2D terminals may perform data communication with a high data rate and low latency. Also, D2D operation may distribute traffic concentrated on a base station, and if used as a repeater, a D2D terminal may perform the role of extending coverage of a base station.

A terminal performing a D2D operation may perform a plurality of D2D channel/signal transmission on separate carriers simultaneously in the same time domain. When the terminal performs a plurality of D2D channel/signal transmission simultaneously on separate carriers, only a limited amount of transmission power may be available. When transmission power is limited, it becomes important for a terminal to determine which D2D channel/signal transmission requires more power, namely priorities of D2D transmission. In this regard, when a terminal performs D2D channel/signal transmission without taking into account transmission priorities, the terminal becomes unable to distribute power properly over different transmission tasks, by which transmission/reception of information important for the terminal and/or a network may become impossible. In other words, when a terminal performs D2D communication without determination of priorities, the terminal (or the network) may fail to receive information that has to be received.

Therefore, the present invention proposes a method for efficiently selecting/performing only part of D2D channel/signal transmission (TX)(/reception (RX)) (and/or WAN UL TX (/DL RX)) when a specific D2D UE has to perform a plurality of D2D channel/signal transmission (TX) (/reception (RX)) (and/or WAN UL TX (/DL TX)) on separate carriers simultaneously in the same time domain (or in the time domain part of which overlaps with others); and a device using the method.

SUMMARY OF THE INVENTION

An object of the present invention is to provide a D2D operation method performed by a terminal in a wireless communication system and a terminal using the method.

A method for Device-to-Device (D2D) operation performed by a UE in a wireless communication system is provided. The method may comprise determining priorities of a plurality of D2D operation when the plurality of D2D operation has to be performed on a plurality of carriers simultaneously and performing one of the plurality of D2D operation on the basis of the priorities, wherein performing the plurality of D2D operation on a plurality of carriers simultaneously indicates that the plurality of D2D operation has to be performed on a plurality of carriers simultaneously in the same time domain.

The determining priorities of a plurality of D2D operation may determine priorities in terms of signal-type based priorities and carrier-type based priorities.

The determining priorities of a plurality of D2D operation may comprise determining priorities so that the signal-type based priorities are applied before the carrier-type priorities, and determining priorities of the plurality of D2D operation by applying the signal-type based priorities before the carrier-type based priorities.

The performing the plurality of D2D operation on a plurality of carriers may simultaneously indicate that a plurality of actual D2D operation at specific time has to be performed on a plurality of carriers simultaneously.

The method may further comprise receiving information indicating that the signal-type based priorities are applied before the carrier-type based priorities.

The determining priorities of a plurality of D2D operation may comprise determining priorities so that the carrier-type based priorities are applied before the signal-type based priorities and determining priorities of the plurality of D2D operation by applying the carrier-type based priorities before the signal-type based priorities.

The performing the plurality of D2D operation on a plurality of carriers may simultaneously indicate that a plurality of actual D2D operation has to be performed on a plurality of carriers simultaneously at specific time.

The method may further comprise receiving information indicating that the carrier-type based priorities are applied before the signal-type based priorities.

The determining priorities on the plurality of D2D operation mat comprise determining to perform D2D operation with a relatively long period beforehand.

The determining to perform D2D operation with a relatively long period beforehand may comprise determining to perform D2D operation based on a first period before D2D operation based on a second period, wherein the first period is longer than the second period.

The performing a plurality of D2D operation on a plurality of carriers may simultaneously indicate that a plurality of actual D2D operation has to be performed on a plurality of carriers simultaneously at specific time.

The method may further comprise receiving information indicating that D2D operation with a relatively long period is performed first.

The plurality of carriers may include a first carrier and a second carrier, and a coverage status of the UE on the first carrier is different from a coverage status on the second carrier, wherein the coverage status is either in-coverage or out-of-coverage.

In another aspect, a user equipment (UE) is provided. The UE may comprise a Radio Frequency (RF) unit transmitting and receiving a radio signal and a processor operating in association with the RF unit, wherein the processor is configured to determine priorities of a plurality of Device-to-Device (D2D) operation when the plurality of D2D operation has to be performed on a plurality of carriers simultaneously and to perform one of the plurality of D2D operation on the basis of the priorities, wherein performing the plurality of D2D operation on a plurality of carriers simultaneously indicates that the plurality of D2D operation has to be performed on a plurality of carriers simultaneously in the same time domain.

According to the present invention, a D2D operation method performed by a terminal in a wireless communication system and a terminal using the method are provided.

According to the present invention, when a terminal performs a plurality of D2D operation on a plurality of carriers, the terminal may determine priorities of the respective D2D operations. Since the terminal determines a priority of each D2D operation, the terminal may put a high priority of power allocation for a D2D operation with a high degree of importance. In other words, a terminal may allocate limited power to the D2D operation of high importance before other tasks, thereby performing D2D operations of high importance without being missed. Accordingly, a terminal (or a network) becomes capable of transmitting/receiving essential information, thereby maximizing utilization of radio resources.

DESCRIPTION OF EXEMPLARY EMBODIMENTS

Figure 1:
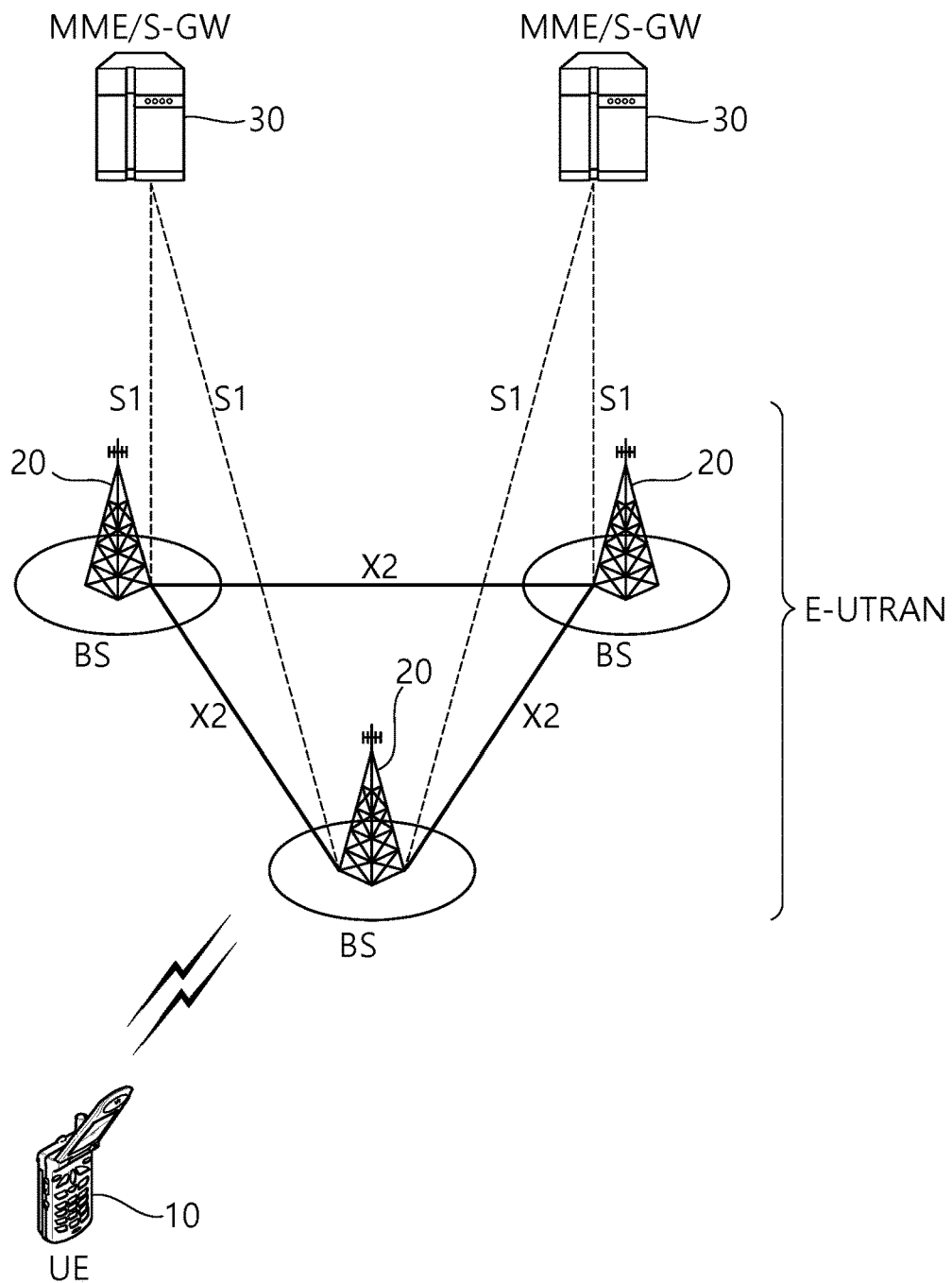
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
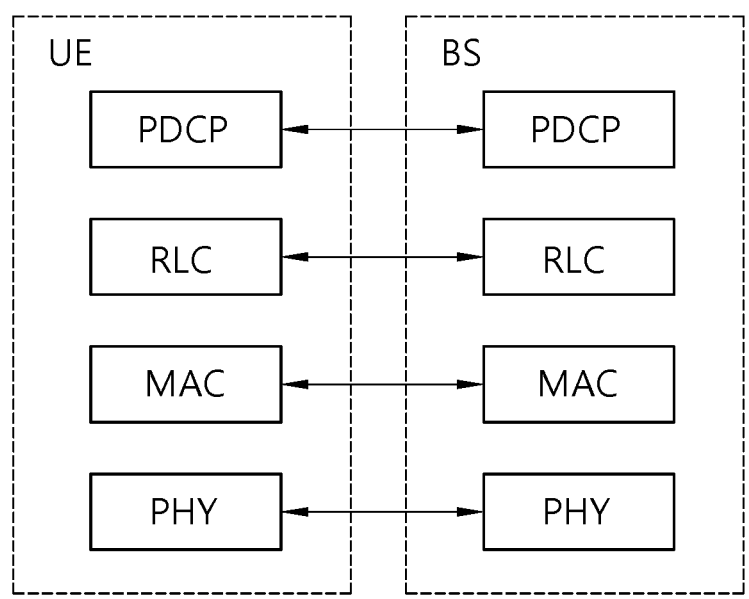
FIG. 2 is a diagram showing a wireless protocol architecture for a user plane.
Figure 3:
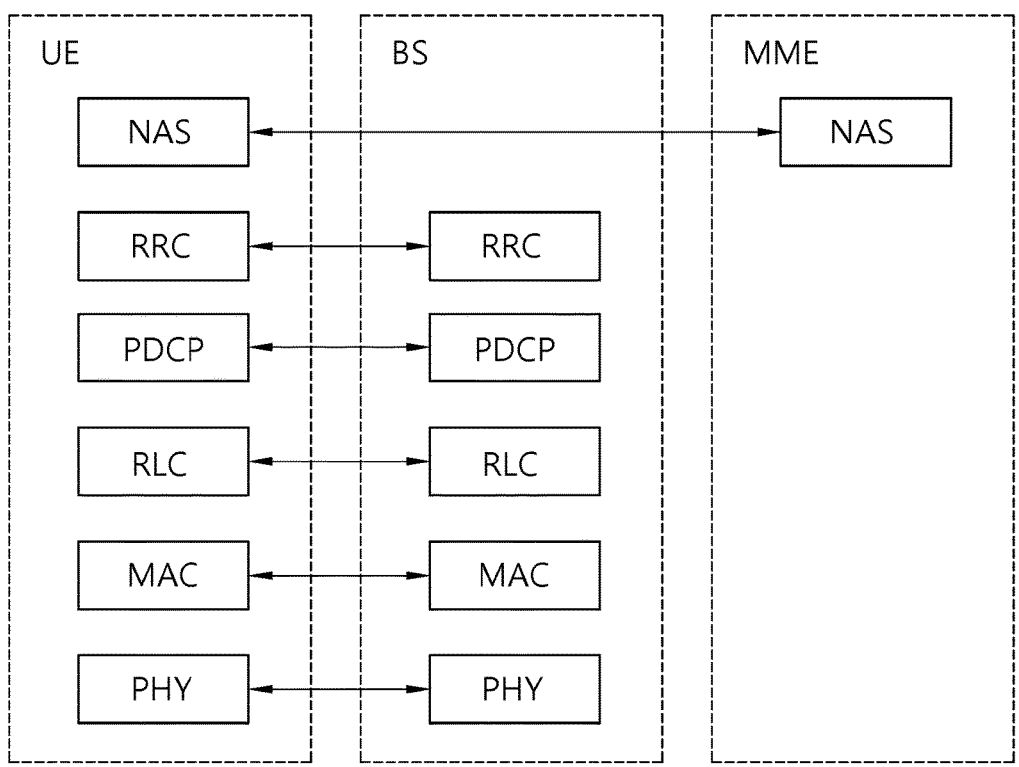
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB 1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
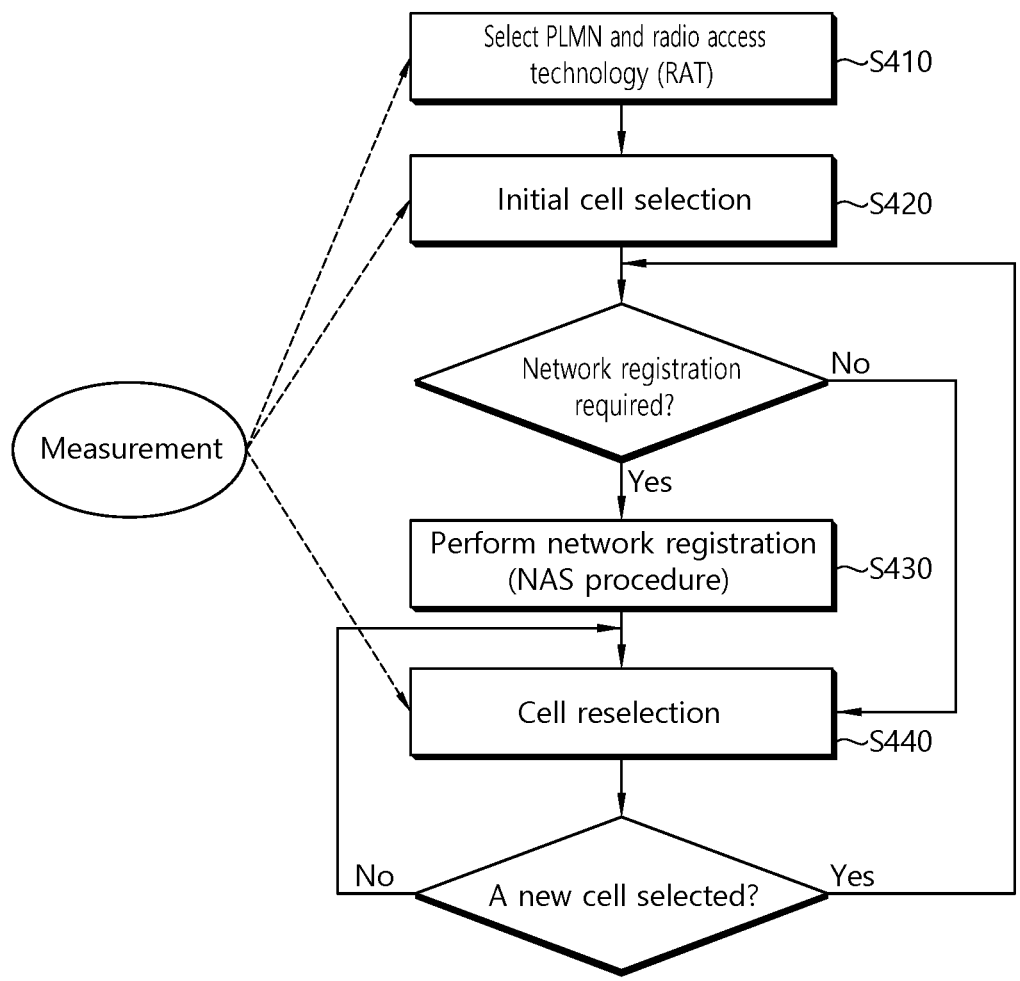
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
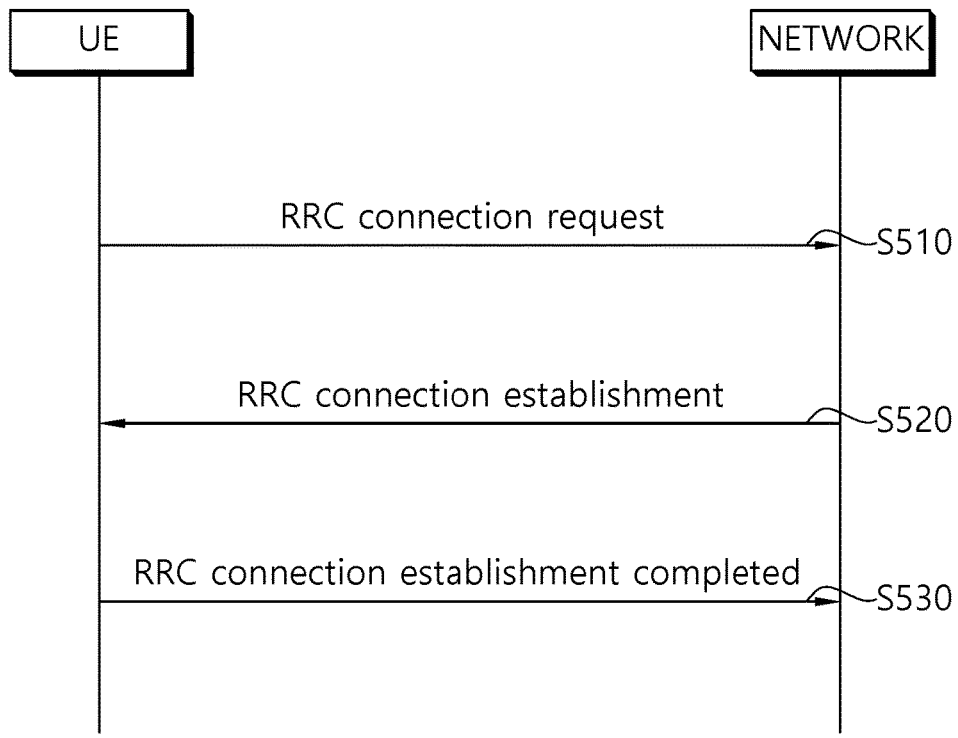
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
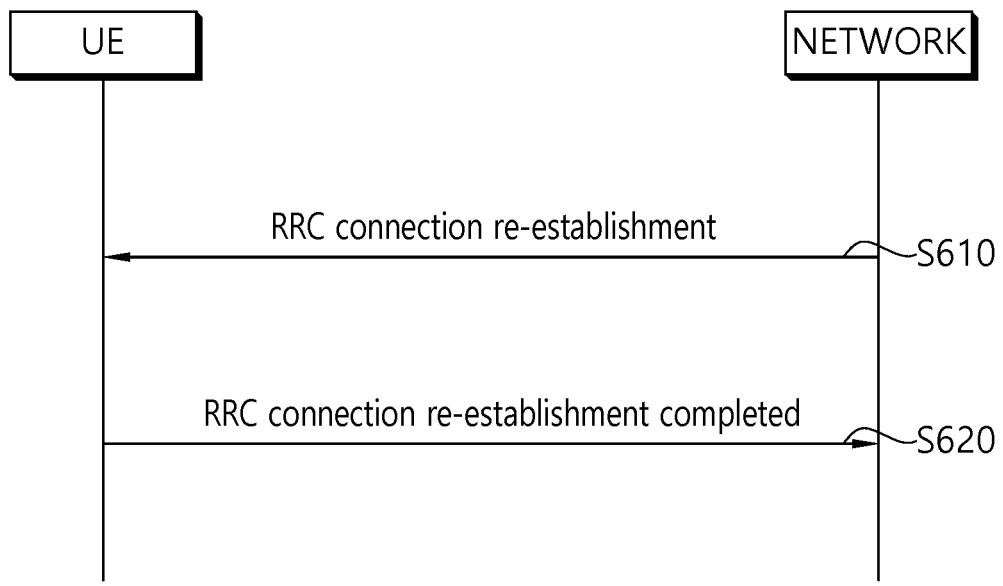
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and

MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srxlev>0 \text{ AND } Squal>0, \qquad \text{[Equation 1]}$$

where:

$$Srxlev = Q_{rxlevmeas} - (Q_{rxlevmin} + Q_{rxlevminoffset}) - P_{compensation};$$

$$Squal = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | max($P_{EMAX}$ − $P_{PowerClass}$, 0) (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: LIE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, \quad R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer, A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
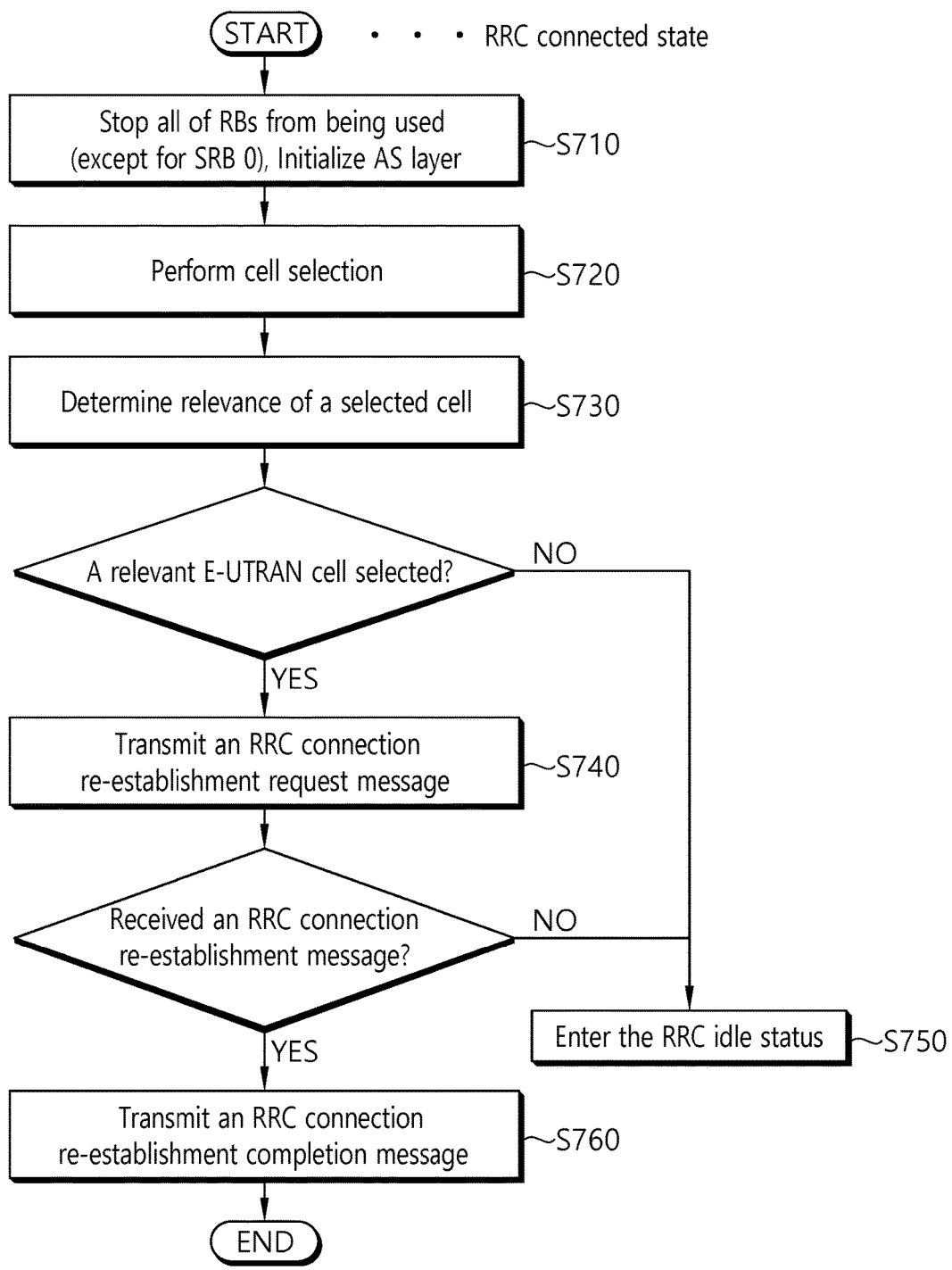
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sub-layer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
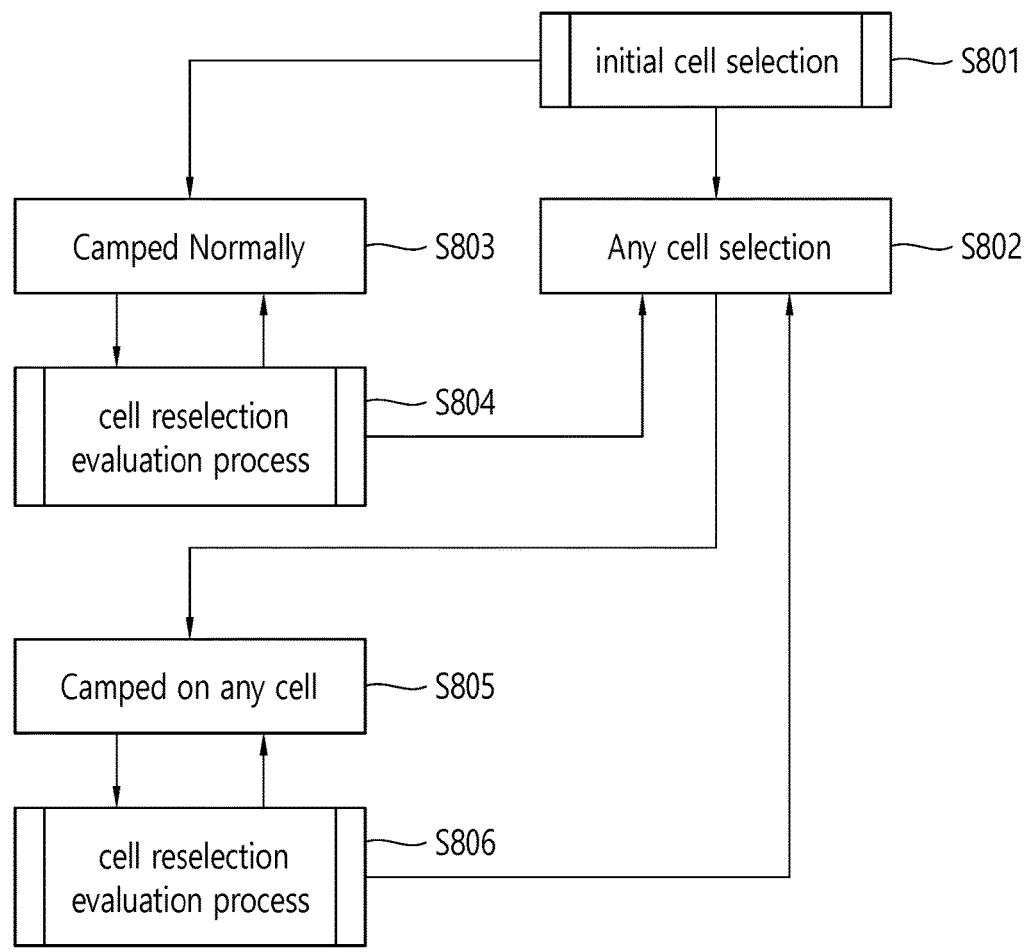
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
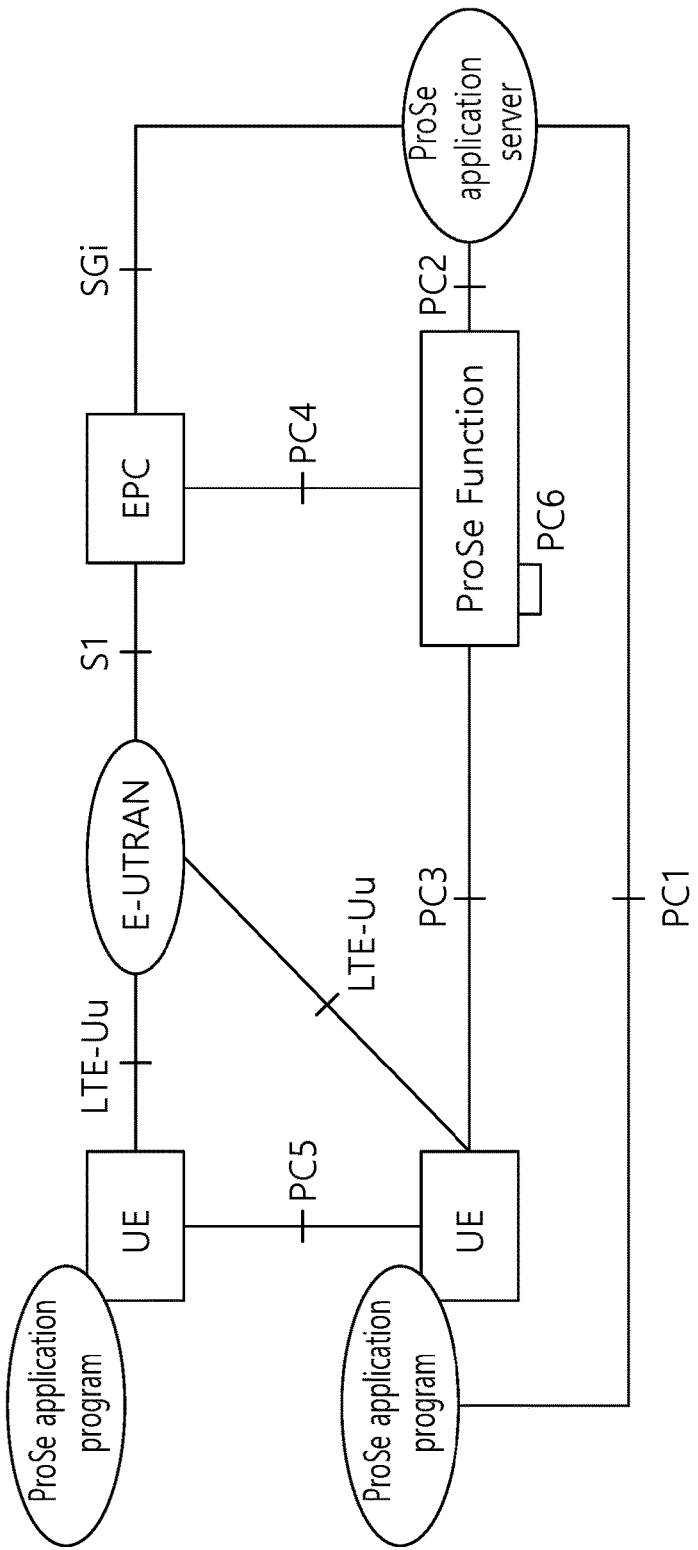
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.
- Interworking via a reference point towards the 3rd party applications
- Authorization and configuration of the UE for discovery and direct communication)
- Enable the function of the EPC level ProSe discovery
- ProSe related new subscriber data and handling of data storage, and also handling of ProSe identities
- Security related function
- Provide control towards the EPC for policy related function
- Provide function for charging (via or outside of EPC, e.g., offline charging))

Hereinafter, a reference point and a reference interface will be described in a reference structure for the ProSe.
- PC1: a reference point between a ProSe application program in the terminal and a ProSe application program in a ProSe application server. The PC1 is used to define signaling requirements in an application level.
- PC2: is a reference point between the ProSe application server and a ProSe function. The PC2 is used to define an interaction between the ProSe application server and a ProSe function. An application data update of a ProSe database of the ProSe function may be an example of the interaction.
- PC3: is a reference point between the terminal and the ProSe function. The PC3 is used to define an interaction between the terminal and the ProSe function. Configuration for ProSe discovery and communication may be an example of the interaction.
- PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.
- PC5: is a reference point to use control/user plane for discovery, communication, and relay between terminals, and 1:1 communication.
- PC6: is a reference point to use a function such as ProSe discovery between users included in different PLMNs.
- SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
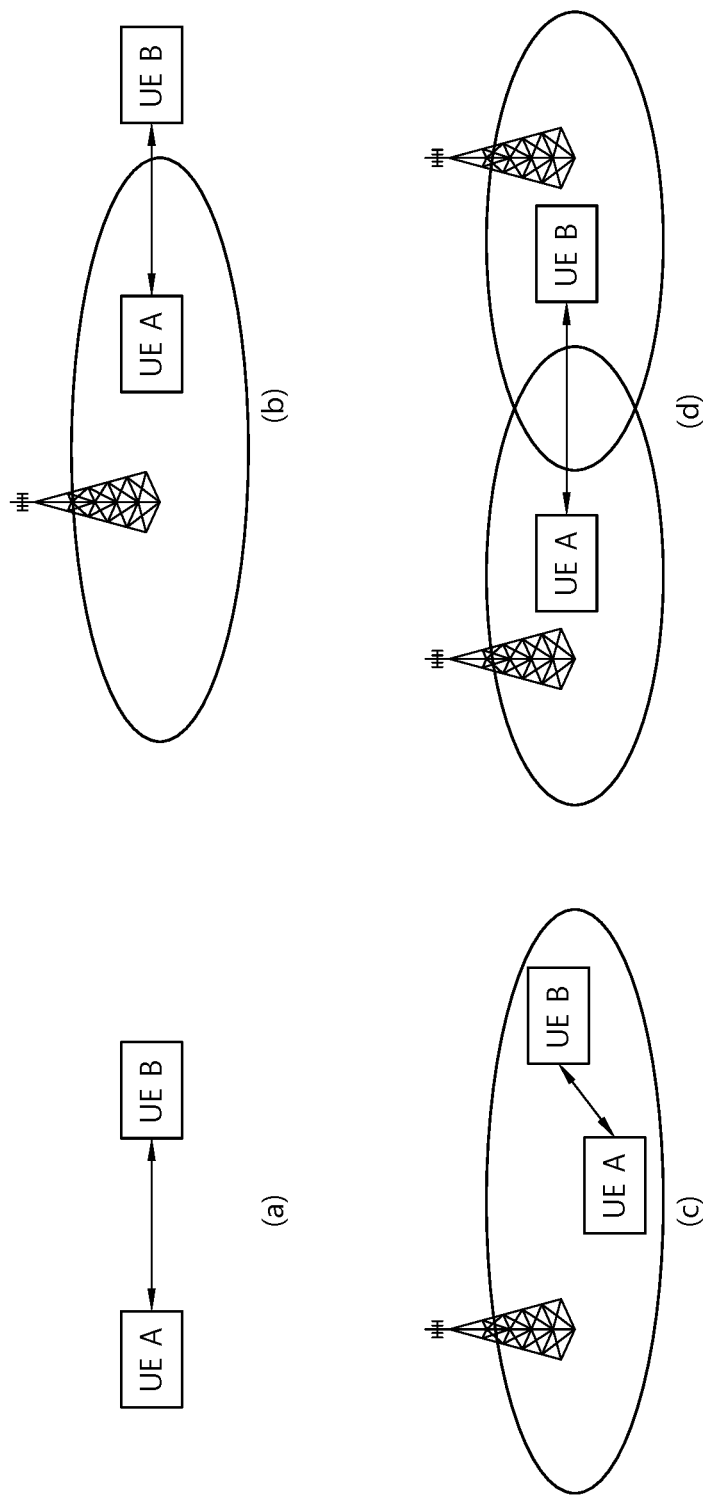
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage.

Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
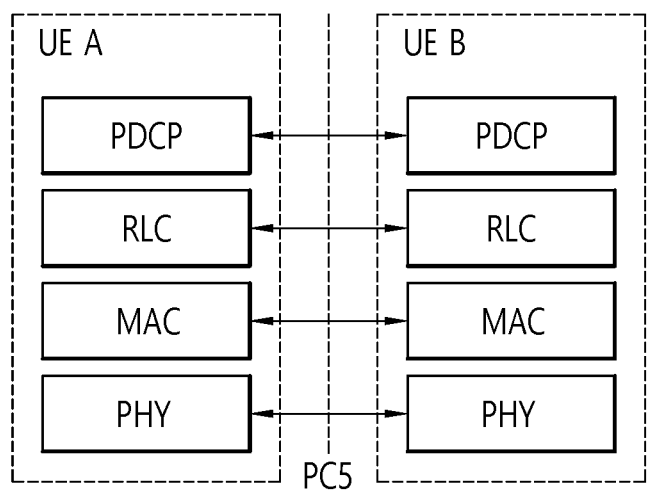
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
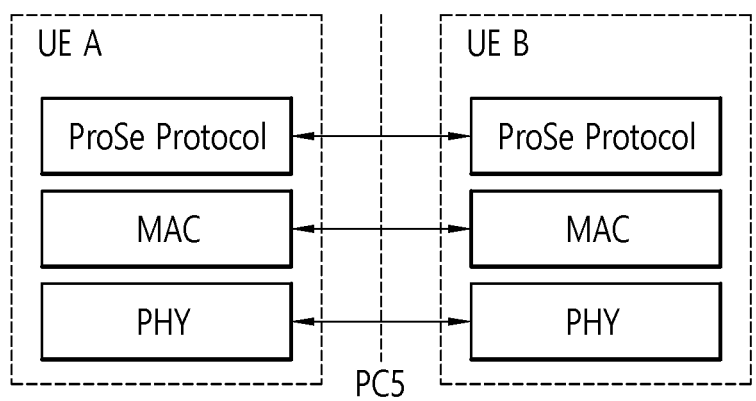
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

In what follows, a carrier aggregation system will be described.

The LTE-A system adopts carrier aggregation (CA), where the carrier aggregation refers to reception and transmission based on aggregation of a plurality of component carriers (CCs). Based on the carrier aggregation, the LTE system extends transmission bandwidth of a UE and increases utilization efficiency of frequency resources.

A component carrier may be divided into a Primary Component Carrier (PCC) and a Secondary Component Carrier (SCC). A PCC is such a kind of component carrier that performs a central role of managing component carriers in a situation where multiple component carriers are used, and a PCC is defined for each UE. A PCC may be called a Primary cell (Pcell).

Other component carriers other than the single PCC may be defined as SCCs. An SCC may be called a Secondary cell (Scell), and a UE may perform uplink transmission through a secondary cell.

Figure 13:
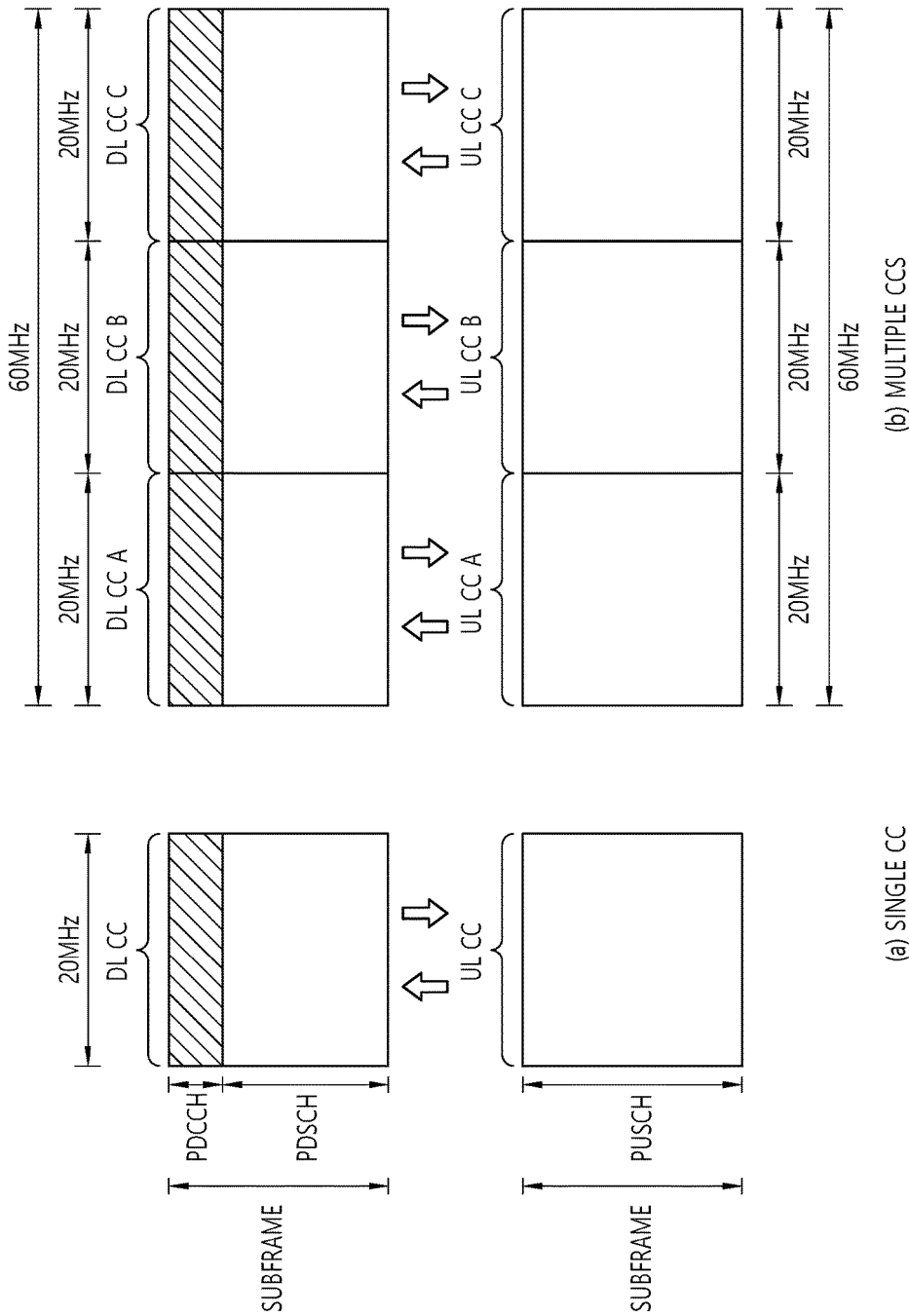
FIG. 13 is an example of comparing a single carrier system with a carrier aggregation system.

FIG. 13 is an example of comparing a single carrier system with a carrier aggregation system.

Referring to FIG. 13, a single carrier system supports only one carrier component for uplink and downlink transmission of a UE. Although the bandwidth of a carrier may be varied, only one carrier is allocated to the UE. On the other hand, a carrier aggregation (CA) system may allocate a plurality of component carriers (DL CCA to C, UL CC A to C) to a UE. For example, three 20 MHz component carriers may be used to allocate bandwidth of 60 MHz to a UE.

A carrier aggregation system may be divided into a contiguous carrier aggregation system in which carriers are contiguous with each other and a non-contiguous carrier aggregation system in which carriers are separated from each other. In what follows, when a system is simply referred to as a carrier aggregation system, it should be understood that the system includes both the contiguous and the non-contiguous case.

When more than one component carrier is aggregated, a target component carrier may use the bandwidth of an existing system for backward compatibility with the existing system. For example, the 3GPP LTE system supports bandwidth of 1.4 MHz, 3 MHz, 5 MHz, 10 MHz, 15 MHz, and 20 MHz while the 3GPP LTE-A system may construct a broadband larger than 20 MHz by using only the bandwidth of the 3GPP LTE system. Or, the 3GPP LTE-A system may construct a broadband by defining new bandwidth instead of using the bandwidth of the existing system.

The system frequency band of a wireless communication system may be described by a plurality of carrier frequencies. Here, a carrier frequency refers to the center frequency of a cell. In what follows, a cell is described as being composed of a pair of downlink frequency resources and uplink frequency resources. Or, a cell may be constructed by using downlink frequency resources only. For most cases, when carrier aggregation is not considered, uplink and downlink frequency resources in a single cell are always defined in pairs.

To perform transmission and reception of packet data through a specific cell, a UE first has to complete configuration of the specific cell. At this time, configuration refers to a state in which a UE has completed reception of system information required for transmitting and receiving data to and from the corresponding cell. For example, configuration may include an overall process of receiving common physical layer parameters required for transmission and reception of data, MAC layer parameters, or parameters required for a specific operation in the RRC layer. A completely configured cell is capable of transmitting and receiving packets immediately as soon as the cell receives the information that packet data may be transmitted.

A cell in a configuration completed status may be in the activation or deactivation state. Here, activation refers to a situation in which a cell performs transmission or reception of data, or the cell is in a ready state. A UE may monitor or receive a control channel (PDCCH) or a data channel (PDSCH) of an activated cell to check resources (which may be frequency or time resources) allocated to the UE.

Deactivation refers to a situation in which a cell is unable to transmit or receive traffic data but capable of measuring or transmitting/receiving least information. A UE may receive system information (SI) required for receiving packets from a deactivated cell. On the other hand, a UE does not monitor nor receive a control channel (PDCCH) and a data channel (PDSCH) of a deactivated cell to check resources (which may be frequency or time resources) allocated to the UE.

A cell may be classified by a primary cell (Pcen), secondary cell (Scell), or a serving cell.

If carrier aggregation is configured, a UE holds only one RRC connection to the network. During the RRC connection establishment/re-establishment/handover process, one cell provides NAS (Non-Access Stratum) mobility information and security input. The aforementioned cell is called a primary cell. In other words, a primary cell refers to the cell in which a UE performs an initial connection establishment procedure or connection re-establishment procedure with respect to an eNB; or the cell designated by the primary cell during the handover process.

A secondary cell refers to the cell configured for providing additional radio resources once an RRC connection is established through a primary cell.

A serving cell refers to the cell configured for providing a service to a UE; when carrier aggregation is not configured or a UE is incapable of providing carrier aggregation, a primary cell is configured as a serving cell. When carrier aggregation is configured, a serving cell may comprise a plurality of serving cells. A plurality of serving cells may be configured to comprise a set of a primary cell and one or more secondary cells.

A PCC (Primary Component Carrier) refers to a CC corresponding to a primary cell. A PCC is such a kind of CC that establishes a connection or an RRC connection with an eNB at the initial stage. A PCC is a special CC that is responsible for a connection or an RRC connection for signaling of a plurality of CCs and manages UE context which is connection information related to a UE. Also, when a PCC is connected to a UE and stays in the RRC Connected mode, the PCC is always in the activation state. A downlink component carrier corresponding to a primary cell is called a DownLink Primary Component Carrier (DL PCC), and an uplink component carrier corresponding to a primary cell is called an UpLink Primary Component Carrier (UL PCC).

An SCC (Secondary Component Carrier) refers to a CC corresponding to a secondary cell. In other words, an SCC is such a kind of CC allocated to a UE in addition to a PCC; an SCC is an extended carrier used for additional resource allocation along with a PCC, which may be in the activation or deactivation mode. A downlink component carrier corresponding to a secondary cell is called a DL Secondary CC (DL SCC), and an uplink component carrier corresponding to a secondary cell is called an UL Secondary CC (UL SCC).

In the case of a component carrier comprising a serving cell, a downlink component carrier may form one serving cell, or a downlink component carrier and an uplink component carrier may be configured to be connected to each other to form one serving cell. Conventionally, only one uplink component does not form a serving cell. However, according to the present invention, a serving cell may be formed by using only uplink component carriers.

Activation/deactivation of a component carrier is directly equivalent to the concept of activation/deactivation of a serving cell. For example, assuming that serving cell 1 comprises DL CC1, activation of the serving cell 1 indicates activation of the DL CC1. If serving cell 2 comprises DL CC2 and UL CC2 being connected to each other, activation of the serving cell 2 indicates activation of DL CC2 and UL CC2. In this sense, each component carrier may correspond to a cell.

The number of component carriers aggregated may be set differently for downlink and uplink. When the number of downlink CCs is the same as the number of uplink CCs, it is called symmetric aggregation; otherwise, it is called asymmetric aggregation. Also, sizes (namely bandwidth) of CCs may vary from each other. For example, suppose that 5 CCs are used to form the bandwidth of 70 MHz. Then the bandwidth may be configured by a combination of 5 MHz CC (carrier #0), 20 MHz CC (carrier #1), 20 MHz CC (carrier #3), and 5 MHz CC (carrier #4).

As described above, different from a single carrier system, a carrier aggregation system may support a plurality of serving cells, namely a plurality of CCs (Component Carriers).

Meanwhile, a carrier aggregation system may support cross-carrier scheduling (CCS). CCS may be used for allocating resources of the PDSCH transmitted through another component carrier by using the PDCCH transmitted through a specific component carrier and/or for allocating resources of the PUSCH transmitted through another component carrier rather than the component carrier linked to the specific component carrier by default. In other words, the PDCCH and the PDSCH may be transmitted through different DL CCs, and the PUSCH may be transmitted through a UL CC belonging to a different cell rather than the UL CC linked to a DL CC to which the PDCCH including a UL grant is transmitted, namely the UL CC constituting the same cell. As described above, a system supporting the CCS requires a carrier indicator indicating a DL CC/UL CC through which the PDSCH/PUSCH is transmitted, the PDSCH/PUSCH being scheduled by the PDCCH.

A carrier aggregation system supporting the CCS may include a carrier indication field (CIF) in the conventional DCI (Downlink Control Information) format. Since a system supporting the CCS, for example, the LTE-A system adds the CIF to the conventional DCI format (namely the DCI format used in the LTE system), the conventional DCI format may be extended by 3 bits, and the PDCCH structure may re-use the existing coding method, resource allocation method (namely CCE-based resource mapping), and so on.

An eNB may configure a set of PDCCH monitoring DL CCs (monitoring CCs). A PDCCH monitoring DL CC set consists of part of DL CCs from among the entire DL CCs aggregated, and if the CCS is configured, the UE performs PDCCH monitoring/decoding only for the DL CC belonging to the PDCCH monitoring DL CC set. In other words, the eNB transmits the PDCCH that schedules the PDSCH/PUSCH only through the DL CC belonging to the PDCCH monitoring DL CC set. The PDCCH monitoring DL CC set may be configured in a UE-specific, UE group specific, or cell-specific manner.

Non-Cross Carrier Scheduling (NCCS) refers to receiving/transmitting scheduling information and accompanying data within the same carrier (cell), which may also be called self-scheduling. NCCS may be regarded as a scheduling method that has been conventionally applied for a UE for which only one cell is configured.

In what follows, the present invention will be described.

A UE performing D2D operation may often perform a plurality of D2D channel/signal transmission on separate carriers simultaneously in the same time domain. When the UE performs a plurality of D2D channel/signal transmission simultaneously on separate carriers, only a limited amount of transmission power may be available. When transmission power is limited, it becomes important for a UE to determine which D2D channel/signal transmission requires more power, namely priorities of D2D transmission. In this regard, when a UE performs D2D channel/signal transmission without priority of the transmission being determined, the UE becomes unable to distribute power properly over different transmission tasks, by which transmission/reception of information important for the UE and/or a network may become impossible. In other words, when a UE performs D2D communication without determination of priorities, the UE (or the network) may fail to receive information that has to be received.

Therefore, the present invention proposes a method for efficiently selecting/performing only part of D2D channel/signal transmission (TX)(/reception (RX)) (and/or WAN UL TX (/DL RX)) when a specific D2D UE has to perform a plurality of D2D channel/signal transmission (TX) (/reception (RX)) (and/or WAN UL TX (/DL TX)) on separate carriers simultaneously in the same time domain (or in the time domain part of which overlaps with others).

In what follows, for the convenience of description of the invention, this document is focused on an embodiment related to D2D operation, but the present invention may be applied to V2X (Vehicle-to-Everything) as well as the D2D operation. The V2X (Vehicle-to-Infra/Vehicle/Nomadic) technology supplements the D2D technology with mobility, by which a vehicle driving on the road communicates continuously with other vehicles or road infrastructure while exchanging and sharing useful information such as traffic situation. V2X networking is divided into three categories: vehicle-to-infrastructure (in what follows, V2I), vehicle-to-vehicle (in what follows, V2V), and vehicle-to-nomadic devices (in what follows, V2N) communication; with regard to the emerging issue of electric vehicle charging, a different kind of communication category V2G (Vehicle-to-Grid) may be added in a near future.

As one example, D2D communication refers to a UE's communicating with other UEs directly by using a wireless channel; in this example, the UE denotes a user terminal, but a network device such as an eNB may also be regarded as one kind of UE when the network device transmits/receives a signal according to a communication scheme between UEs.

Also, as one example, the channel/signal types and abbreviations used for D2D communication are as follows.
Physical Sidelink Broadcast Channel: PSBCH
Physical Sidelink Control Channel: PSCCH
Physical Sidelink Discovery Channel: PSDCH
Physical Sidelink Shared Channel: PSSCH
Sidelink Synchronization Signal: SLSS
a) Primary Sidelink Synchronization Signal: PSSS
b) Secondary Sidelink Synchronization Signal: SSSS As one example, when a specific D2D UE has to perform a plurality of D2D channel/signal TX (/RX) (and/or WAN UL TX (/DL RX)) on a single (or multiple) carrier simultaneously (in the same time domain (or in the time domain part of which overlaps with others)), it may be configured so that only part of (or specific) D2D channel/signal TX (/RX) (and/or WAN UL TX (/DL RX)) (having a relatively high priority) may be performed according to the priority rule (Table 2) given below.

Here, in one example, the corresponding rule may be interpreted such that WAN (UL TX) communication has a higher priority than D2D communication (i.e., rule#A, rule#B, and rule#C) and/or SLSS has the highest priority among D2D channel(s)/signal(s) (i.e., rule#D) and/or D2D channel/signal TX based on the resource indicated by an eNB (or triggered by the eNB) has a higher priority than D2D channel/signal TX based on the resources selected by the D2D UE itself (or selected arbitrarily) (among (type1/type2B) PSDCH(s)) (i.e., rule#E) and/or priorities decrease in the order of SLSS, D2D communication channel(s), and D2D discovery channel(s) among D2D channel(s)/signal(s) (i.e., the priority of a channel/signal becomes lower from the left to the right) and/or D2D channel(s)/signal(s) RX (/TX) on the carrier configured by an eNB has a higher priority than the D2D channel(s)/signal(s) RX (/TX) on the carrier not configured by the eNB.

Also, in on example, Table 2 below may be interpreted to define priorities among channel(s)/signal(s) overlapping (partly or fully) in the time domain with respect to the channel/signal type (rather than carrier type).

TABLE 2

(Rule#A) If a UE uplink transmission in subframe n + 1 of a serving cell overlaps in time domain with sidelink transmission/reception by the UE in subframe n of the serving cell, then the UE shall drop the sidelink transmission/reception in subframe n.
(Rule#B) For a given carrier frequency, a UE shall not transmit a sidelink signal or channel overlapping partly or completely in time with an uplink transmission from the same UE.
(Rule#C) For a given carrier frequency, with the exception of PSSCH transmissions with transmission mode 1 and same sidelink cyclic prefix as PUSCH, no sidelink transmissions shall occur in sidelink subframe n from a UE if uplink SRS is transmitted from the same UE in uplink subframe n.
(Rule#D) PSDCH, PSCCH and PSSCH transmissions shall not take place in SLSS subframes configured for transmission of SLSS.
(Rule#E) A UE shall drop any PSDCH transmissions that are associated with sidelink discovery type 1 in a sidelink subframe if the UE has a PSDCH transmission associated with sidelink discovery type 2B in that subframe.
(Rule#F) In case of a UE capable of transmission on multiple carriers, sidelink transmission may only occur on a single carrier frequency at a given time.
(Rule#G) A UE with limited transmission capabilities shall at a given time first prioritize uplink transmissions, followed by sidelink communication transmissions (PSSS, SSSS, PSBCH, PSSCH, PSCCH) and last sidelink discovery transmissions (PSDCH).
(Rule#H) A UE with limited reception capabilities shall at a given time first prioritize downlink reception, followed by sidelink communication reception, sidelink discovery reception on carriers configured by the eNodeB, and last sidelink discovery reception on carriers not configured by the eNodeB.

The present invention proposes a method for efficiently performing part of (or specific) D2D channel/signal TX (/RX) (and/or WAN UL TX (/DL RX)) according to predefined (or signaled) priorities when a specific D2D UE has to perform D2D channel/signal TX (/RX) (and/or WAN UL TX (/DL RX)) on a plurality of carriers simultaneously (in the same time domain (or in the time domain part of which overlaps with others)).

Here, in one example, a rule may be defined so that the proposed methods are applied only to the case in which a D2D UE of limited TX (/RX) capability has to perform D2D channel/signal TX (/RX) (and/or WAN UL TX (/DL RX)) on a plurality of carriers simultaneously (in the same time domain (or in the time domain part of which overlaps with others)).

Also, in one example, the proposed methods may be used (or applied) to the case of determining a D2D channel/signal (and/or WAN UL) for which power is allocated with a high priority when a D2D UE with power limited capability has to perform D2D channel/signal TX (and/or WAN UL TX) on a plurality of carriers simultaneously (in the same time domain (or in the time domain part of which overlaps with others)).

Also, in one example, for the convenience of description of the present invention, it is assumed that the channel/signal based priority is determined in the order of (1) WAN (UL TX/DL RX), (2) SLSS (/PSBCH) (TX/RX), (3) D2D communication channel (TX/RX) (or PSCCH (TX/RX) followed by PSSCH (TX/RX)), and (4) D2D discovery channel (TX/RX) (and/or in the order of (1) D2D channel/signal transmitted (received) from a resource pool with a relatively high application/group/user priority and (2) D2D channel/signal transmitted (received) from a resource pool with a relatively low application/group/user priority and/or in the order of (1) D2D channel/signal (TX/RX) based on a relatively long (or short) (D2D resource pool) period and (2) D2D channel/signal (TX/RX) based on a relatively short (or long) (D2D resource pool) period), where the priority of a channel/signal becomes lower from the left to the right.

Also, in one example, it is assumed that the carrier-type based priority is determined in the order of (1) D2D communication-related carrier for public safety (PS) application and (2) D2D communication-related D2D carrier for non-PS application (and/or in the order of (1) D2D communication related carrier configured by an eNB and (2) D2D communication related D2D carrier not configured by an eNB and/or in the order of (1) D2D communication related carrier of INTRA-PLMN and D2D communication related carrier of INTER-PLMN and/or in the order of (1) a carrier on which D2D TX operation is performed and (2) a carrier on which D2D RX operation is performed (or in the order of (1) a carrier on which D2D RX operation is performed and (2) a carrier on which D2D TX operation is performed) and/or in the order of (1) Pcell and (2) Scell and/or (1) a carrier for which a resource pool with a relatively high application/group/user priority is applied and (2) a carrier for which a resource pool with a relatively low application/group/user priority is applied and/or in the order of a carrier for which a D2D resource (TX/RX) pool with a relatively long (or short) period is applied and (2) a carrier for which a D2D resource (TX/RX) pool with a relatively short (or long) period is applied), where the priority of a channel/signal becomes lower from the left to the right.

In one example, methods according to the present invention may also be used for a situation in which carrier-type based priority and/or channel/signal-type based priority different from the description given above is applied.

Figure 14:
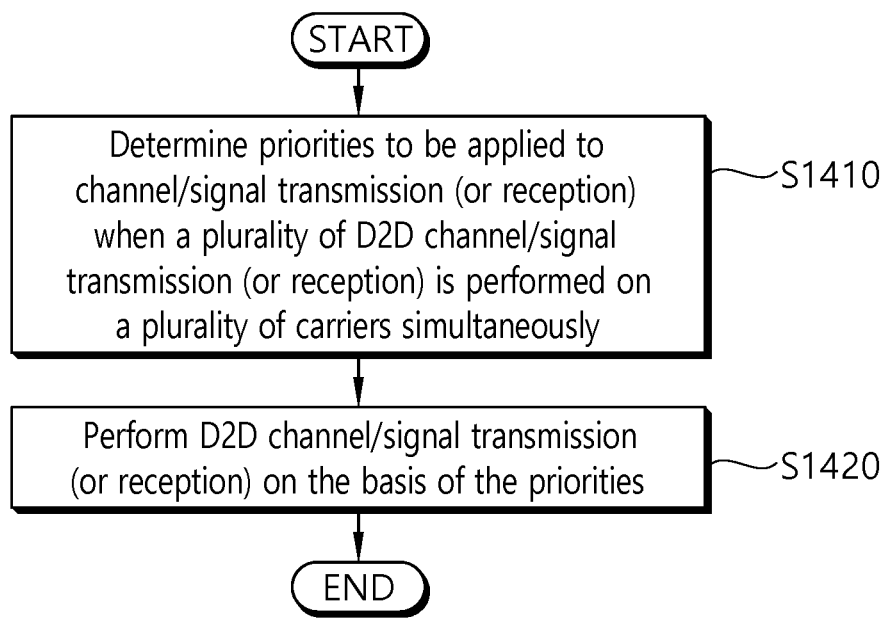
FIG. 14 is a flow diagram of a priority determination method according to one embodiment of the present invention.

FIG. 14 is a flow diagram of a priority determination method according to one embodiment of the present invention.

Referring to FIG. 14, when a D2D UE performs a plurality of D2D channel and/or signal transmission (or reception) on a plurality of carriers simultaneously, the D2D terminal may determine the priority of channel and/or signal transmission (or reception) S1410. The plurality of carriers may include a first and a second carrier, and the UE may assign a different coverage state to each of the first and the second carrier different from the carrier aggregation case. For example, the UE may correspond to an in-coverage UE on the first carrier while it is also an in-coverage UE on the second carrier. Also, the UE may correspond to an in-coverage UE on the first carrier while it is an out-coverage UE on the second carrier. Also, the UE may correspond to an out-coverage UE on the first carrier while it is an in-coverage UE on the second carrier. Also, the UE may be an out-coverage UE on the first carrier while it is also an out-coverage UE on the second carrier.

At this time, a detailed description for a D2D UE to determine priorities will be given by the proposed method #1, proposed method #2, proposed method #3, proposed method #4, and proposed method #5 below.

Afterwards, a D2D UE may perform D2D channel and/or signal transmission (or reception) on the basis of priorities S1420. Detailed descriptions about a D2D UE's performing D2D channel and/or signal transmission (or reception) on the basis of priorities are the same as already given above.

[Proposed Method#1]

Figure 15:
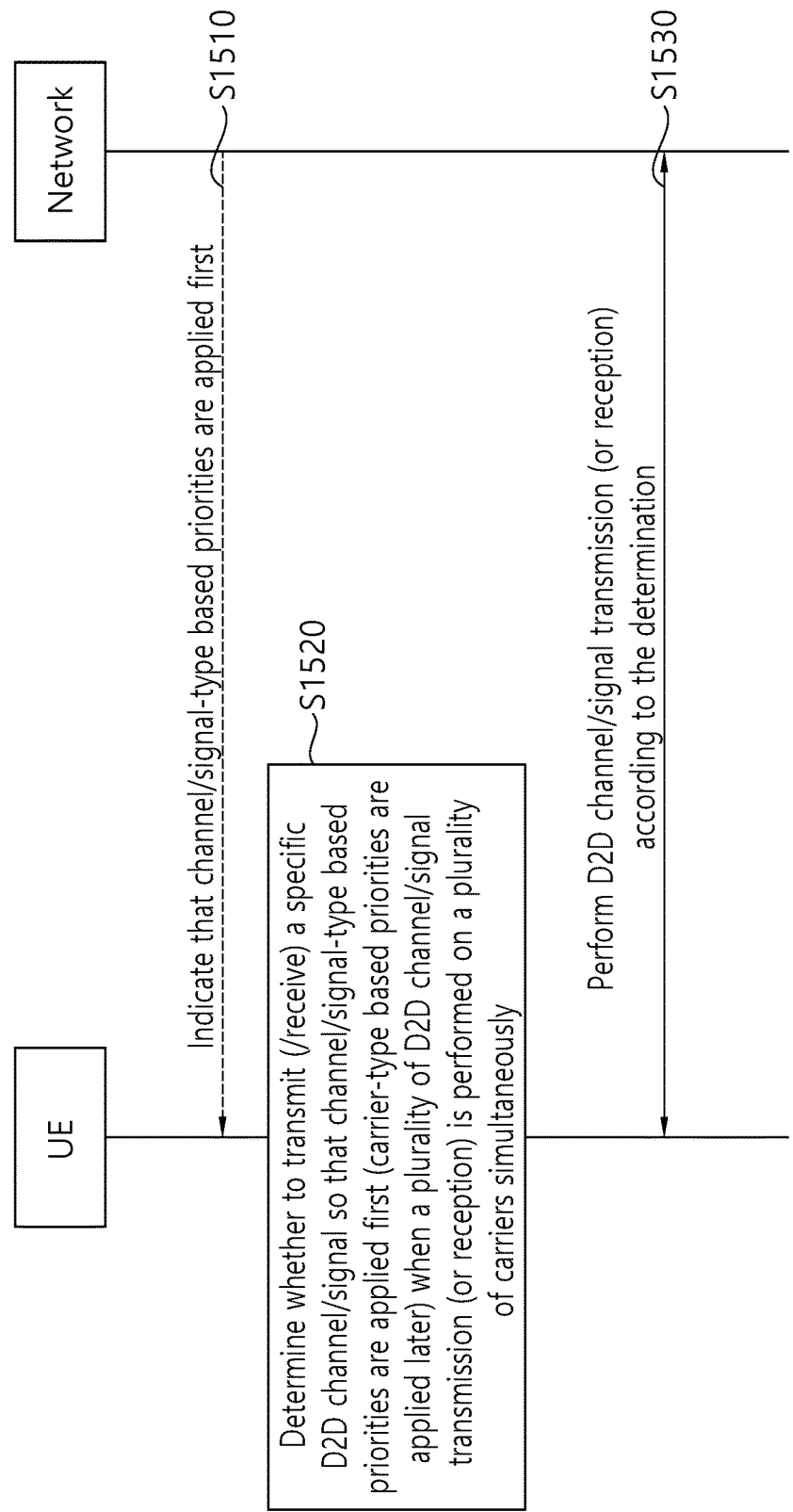
FIG. 15 is a flow diagram of a priority determination method according to another embodiment of the present invention.

FIG. 15 is a flow diagram of a priority determination method according to another embodiment of the present invention.

Referring to FIG. 15, a UE may receive information (or an indicator) from a network, which indicates that channel/signal-type based priorities are applied first S1510. At this time, the S1510 step may not be an essential element of the present invention. In other words, a UE may be configured in advance that channel/signal-type based priorities are applied first.

When a plurality of D2D channel/signal transmission (reception) is performed on a plurality of carriers simultaneously, the UE may determine whether to transmit (or receive) a specific D2D channel/signal so that channel/signal-type based priorities may be applied first (carrier-type priorities may be applied later) S1520. In other words, the UE may determine so that channel/signal-type based priorities may be applied before the carrier-type priorities, and detailed descriptions of the channel/signal-type based priorities and carrier-type based priorities are the same as already described above.

More specifically, a rule may be defined such that channel/signal-type based priorities may be applied beforehand (carrier-type based priorities may be applied later) for determining transmission (or reception) of a predefined (or signaled) specific D2D channel/signal.

At this time, in one example, the corresponding specific D2D channel/signal may be defined by SLSS (/PSBCH) (or PSDCH or PSCCH or PSSCH).

At this time, in one example, when predefined (or signaled) specific D2D channel/signal TX (/RX) of which the channel/signal-type based priority is the same on a plurality of carriers overlaps with each other (partly or completely) in the time domain, the carrier-type based priorities applied later may be used for the purpose of tie breaking. Here, the tie breaking is introduced to prevent the same priorities from being generated.

In one example, when such a rule is applied, it may be interpreted so that carrier-type based priorities are applied beforehand (channel/signal-type based priorities are applied later) among the remaining D2D channels/signals (and/or WAN UL (/DL)) except for the corresponding specific D2D channel/signal.

As one specific example to which the proposed rule is applied, when PSDCH SLCC (/PSBCH) transmission on carrier#A (for example, Scell) overlaps (completely or partly) PSCCH/PSSCH transmission on carrier#B (for example, Pcell), though the priority of carrier#A is lower than that of carrier#B according to the carrier-type based priorities, a D2D UE (single TX chain) finally performs PSDCH SLSS (/PSBCH) transmission on the carrier#A (PSCCH/PSSCH transmission on the carrier#B is omitted).

In another example, the proposed rule may be defined to be limited to the case in which D2D channel/signal TX (/RX) (and/or WAN UL TX (/DL RX)) has to be performed simultaneously on predefined (or signaled) specific (multiple) carriers (in the same time domain (or in the time domain part of which overlaps with others)) (or in which D2D channel/signal TX (/RX) (and/or WAN UL TX (/RX)) has to be performed simultaneously on a plurality of carriers of which carrier-type based priorities are the same to each other (in the same time domain (or in the time domain part of which overlaps with others)).

Here, in one example, it may be interpreted so that when D2D channel/signal TX (/RX) (and/or WAN UL TX (/DL RX)) has to be performed simultaneously (in the same time domain (or in the time domain part of which overlaps with others)) on the remaining carriers (or on a plurality of carriers of which carrier-type based priorities are different from each other) except for (a plurality of) carriers to which the proposed rule is applied, carrier-type based priorities are applied beforehand (channel/signal-type based priorities are applied later).

As another example, a rule may be defined so that when a specific D2D UE has to perform D2D channel/signal TX (/RX) (and/or WAN UL TX (/DL RX)) on a plurality of carriers (in the same time domain (or in the time domain part of which overlaps with others)), channel/signal-type based priorities are always applied first (carrier-type based priorities are applied later).

Afterwards, a UE may perform D2D channel/signal transmission (or reception) according to the determination made above S1530.

[Proposed Method#2]

Figure 16:
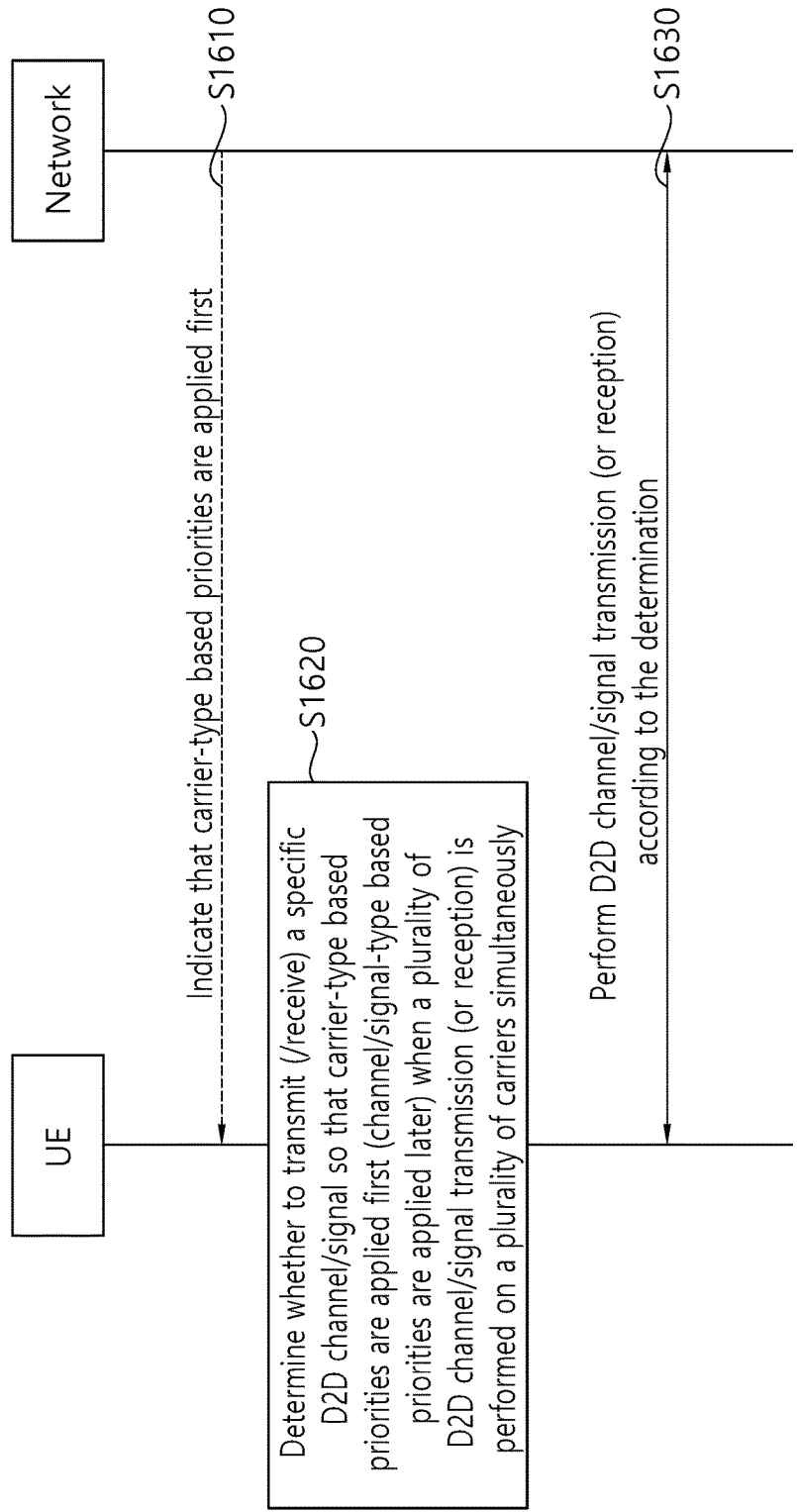
FIG. 16 is a flow diagram of a priority determination method according to a yet another embodiment of the present invention.

FIG. 16 is a flow diagram of a priority determination method according to a yet another embodiment of the present invention.

Referring to FIG. 16, a UE may receive information (or an indicator) from a network, which indicates that carrier-type based priorities are applied first S1510. At this time, the S1610 step may not be an essential element of the present invention. In other words, a UE may be configured in advance that carrier-type based priorities are applied first.

When a plurality of D2D channel/signal transmission (reception) is performed on a plurality of carriers simultaneously, the UE may determine whether to transmit (or receive) a specific D2D channel/signal so that carrier-type based priorities may be applied first (channel/signal-type priorities may be applied later) S1620. In other words, the UE may determine so that carrier-type based priorities may be applied before the channel/signal-type priorities, and detailed descriptions of the channel/signal-type based priorities and carrier-type based priorities are the same as already described above.

More specifically, a rule may be defined such that carrier-type based priorities may be applied beforehand (channel/signal-type based priorities may be applied later) for determining transmission (or reception) of a predefined (or signaled) specific D2D channel/signal.

At this time, in one example, the corresponding specific D2D channel/signal may be defined by PSDCH (or SLSS (/PSBCH) or PSCCH or PSSCH).

At this time, in one example, when predefined (or signaled) specific D2D channel/signal TX (/RX) of which the carrier-type based priority is the same on a plurality of carriers overlaps with each other (partly or completely) in the time domain, the channel/signal-type based priorities applied later may be used for the purpose of tie breaking.

In one example, when such a rule is applied, it may be interpreted so that channel/signal-type based priorities are applied beforehand (carrier-type based priorities are applied later) among the remaining D2D channels/signals (and/or WAN UL (/DL)) except for the corresponding specific D2D channel/signal.

As one specific example to which the proposed rule is applied, when PSCCH/PSSCH transmission on carrier#A (for example, Scell) overlaps (completely or partly) PSDCH transmission on carrier#B (for example, Pcell), though the priority of PSCCH/PSSCH transmission is higher than that of PSDCH transmission according to the channel/signal-type based priorities, a D2D UE (single TX chain) finally performs PSDCH transmission on the carrier#B (PSCCH/PSSCH transmission on the carrier#A is omitted).

In another example, the proposed rule may be defined to be limited to the case in which D2D channel/signal TX (/RX) (and/or WAN UL TX (/DL RX)) has to be performed simultaneously on predefined (or signaled) specific (multiple) carriers (in the same time domain (or in the time domain part of which overlaps with others)) (or in which D2D channel/signal TX (/RX) (and/or WAN UL TX (/RX)) has to be performed simultaneously on a plurality of carriers of which channel/signal-type based priorities are the same to each other (in the same time domain (or in the time domain part of which overlaps with others))).

Here, in one example, it may be interpreted so that when D2D channel/signal TX (/RX) (and/or WAN UL TX (/DL RX)) has to be performed simultaneously (in the same time domain (or in the time domain part of which overlaps with others)) on the remaining carriers except for (a plurality of) carriers to which the proposed rule is applied (or when D2D channel/signal TX (/RX) (and/or WAN UL TX (/DL RX)) of which channel/signal-type based priorities are different from each other has to be performed on a plurality of carriers (in the same time domain (or in the time domain part of which overlaps with others)), channel/signal-type based priorities are applied beforehand (carrier-type based priorities are applied later).

As another example, a rule may be defined so that when a specific D2D UE has to perform D2D channel/signal TX (/RX) (and/or WAN UL TX (/DL RX)) on a plurality of carriers (in the same time domain (or in the time domain part of which overlaps with others)), carrier-type based priorities are always applied first (channel/signal-type based priorities are applied later).

As a yet another example, in the case of an out-coverage UE, the UE may perform D2D operation on a carrier configured for the purpose of PS.

Afterwards, the UE may perform D2D channel/signal transmission (or reception) according to the determination S1630.

[Proposed Method#3]

Figure 17:
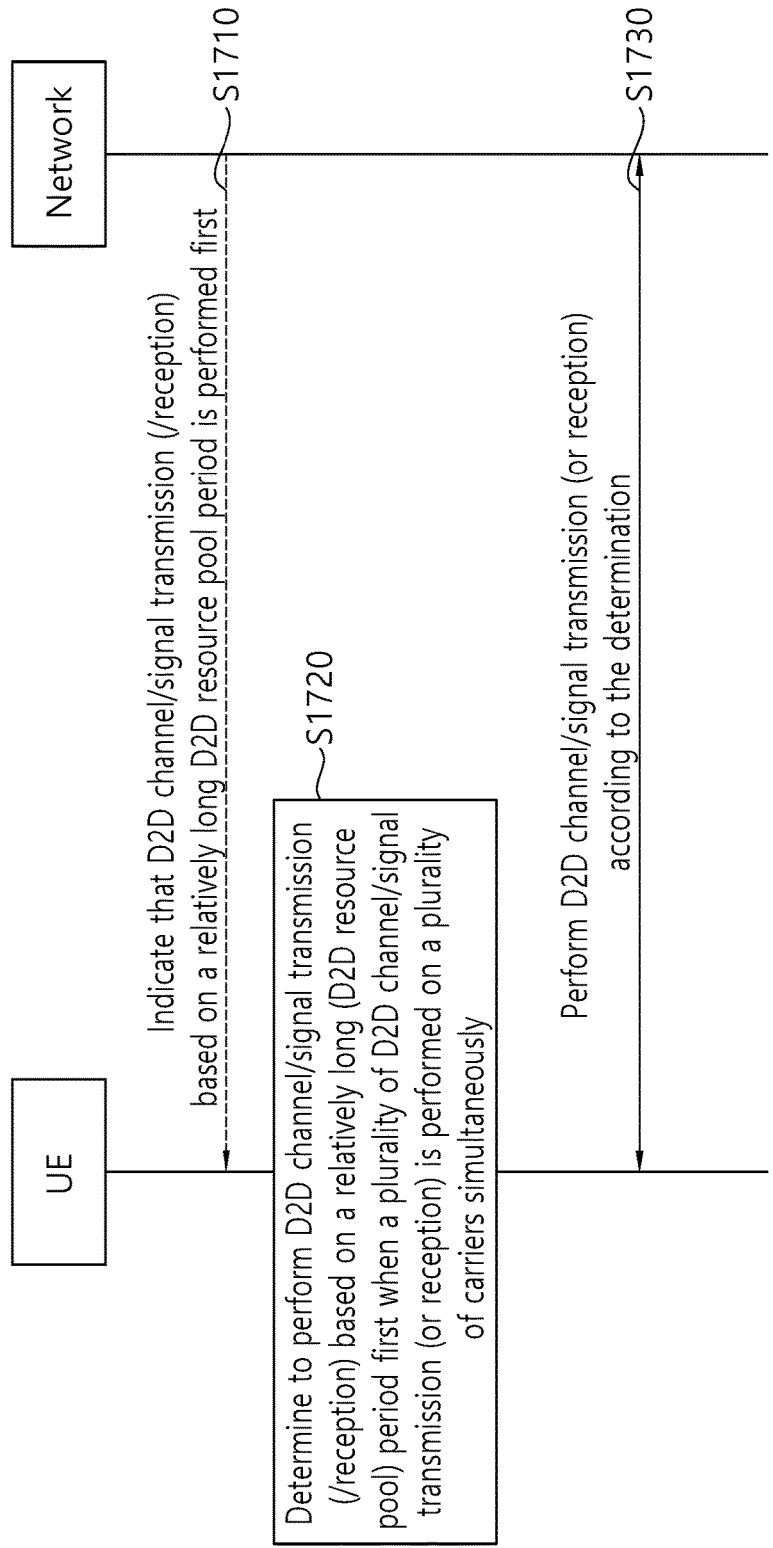
FIG. 17 is a flow diagram of a priority determination method according to a still another embodiment of the present invention.

FIG. 17 is a flow diagram of a priority determination method according to a still another embodiment of the present invention.

Referring to FIG. 17, a UE may receive information (or an indicator) from a network, which indicates that D2D channel/signal transmission (/reception) is performed first S1710. At this time, the S1710 step may not be an essential element of the present invention. In other words, a UE may be configured in advance that carrier-type based priorities are applied first.

When a plurality of D2D channel/signal transmission (reception) is performed on a plurality of carriers simultaneously, the UE may determine so that D2D channel/signal transmission (/reception) based on a relatively long (D2D resource pool) period may be performed first S1720.

More specifically, a rule may be defined so that D2D channel/signal transmission (/reception) based on a relatively long (D2D resource pool) period may be performed first.

At this time, in one example, when D2D channel/signal TX (/RX) having the same (D2D resource pool) period on a plurality of carriers overlaps with each other (partly or completely) in the time domain, the carrier-type based priorities (and/or channel/signal-type based priorities) may be used for the purpose of tie breaking.

As one specific example to which the proposed rule is applied, when period T based PSDCH transmission on carrier#A overlaps (completely or partly) period U-based PSCCH/PSSCH transmission on carrier#B (for example, Pcell) (namely it is assumed that 'T>U'), though the priority of PSCCH/PSSCH transmission (carrier#B) is higher than that of PSDCH transmission (carrier#A) according to the channel/signal-type based priorities or the carrier-type based priorities, a D2D UE (single TX chain) finally performs PSDCH transmission on the carrier#A (PSCCH/PSSCH transmission on the carrier#B is omitted).

Also, in one example, a rule may be defined to be limited to the case in which D2D channel/signal TX (/RX) (and/or WAN UL TX (/DL RX)) has to be performed simultaneously (in the same time domain (or in the time domain part of which overlaps with others)) on predefined (or signaled) specific (multiple) carriers (or in which D2D channel/signal TX (/RX) (and/or WAN UL TX (/RX)) has to be performed simultaneously on a plurality of carriers of which channel/signal-type based priorities are the same to each other (in the same time domain (or in the time domain part of which overlaps with others)) or in which D2D channel/signal TX (/RX) (and/or WAN UL TX (/RX)) has to be performed simultaneously on a plurality of carriers of which carrier-type based priorities are the same to each other (in the same time domain (or in the time domain part of which overlaps with others))).

Also, in one example, a rule may be defined so that D2D channel/signal transmission (/reception) based on a relatively short (D2D resource pool) period is performed first.

Afterwards, the UE may perform D2D channel/signal transmission (or reception) according to the determination S1730.

The embodiments described above may be applied together with (or independently of) the following embodiments.

[Proposed Method#4]

A rule may be defined so that (part or all of) the proposed methods (for example, [Proposed method#1], [Proposed method#2], and [Proposed method#3]) may be applied only for a D2D channel/signal (and/or WAN UL (/DL)) (on a plurality of carriers) of which actual D2D channel/signal TX(/RX) (and/or WAN UL TX (/DL RX)) (actually) overlaps at specific time.

In other words, in one example, it may be interpreted such that D2D channel/signal (and/or WAN UL (/DL)) or carrier selection switching is performed in terms of actual D2D channel/signal (and/or WAN UL (/DL)) TX (/RX).

At this time, in one example, carrier and/or D2D channel/signal (and/or WAN UL (/DL)) for which actual D2D channel/signal TX (/RX) (and/or WAN UL TX (/DL RX)) is not performed does not affect determination of D2D channel/signal (and/or WAN UL (/DL)) finally transmitted (/received).

In another example, D2D channel/signal TX (/RX) (with the highest priority) selected by (part or all of) the proposed methods (for example, [Proposed method#1], [Proposed method#2], and [Proposed method#3]) may be regarded as the corresponding D2D channel/signal (with the highest priority)-related TX (/RX) resource pool (or carrier) selected in a semi-static manner (or in a static manner).

At this time, in one example, a rule may be defined so that when D2D channel/signal TX (/RX) (with the highest priority) is selected according to (part or all of) the proposed methods (for example, [Proposed method#1], [Proposed method#2], and [Proposed method#3]), the selection is performed in terms of allocated resource TX (/RX) pool (namely a finally transmitted (received) D2D channel/signal is determined by taking into account (virtually) the carrier on which actual D2D channel/signal TX (/RX) is not performed and/or D2D channel/signal together) rather than in terms of actual (D2D channel/signal) TX (/RX).

At this time, in one example, when the aforementioned rule is applied, according to predefined (or signaled) switching (or circulation) period (or according to an indicator received by an eNB), the rule may be defined so that selected D2D channel/signal related TX (/RX) resource pool (or carrier) may be changed (or circulated) (in a descending order of priority).

[Proposed Method#5]

A rule may be defined so that an eNB may inform a D2D UE about which method (or rule) to apply from among the proposed methods (for example, [Proposed method#1], [Proposed method#2], [Proposed method#3], and [Proposed method#4]) through predefined signaling (for example, SIB, (dedicated) RRC signaling).

Since examples of the proposed methods described above may also be regarded as embodiments of the present invention, it is obvious that the examples may be regarded as a kind of proposed methods.

Also, although the proposed methods above may be implemented independently, they may also be implemented in the form of a combination (or merge) of part of the proposed methods.

A rule may be defined so that the proposed methods above are applied to be limited to the FDD system (and/or TDD system).

A rule may also be defined so that the proposed methods above are applied to be limited to mode 2 communication and/or type 1 discovery (and/or mode 1 communication and/or type 2 discovery).

Also, a rule may also be defined so that the proposed methods above are applied to be limited to in-coverage D2D UEs (and/or out-coverage D2D UEs) (and/or RRC_CONNECTED D2D UEs (and/or RRC_IDLE D2D UEs) and/or relay D2D UEs (and/or remote UEs (participating in relay communication))).

A rule may also be defined so that the proposed methods above are applied to be limited to D2D UEs performing only D2D discovery (transmission (/reception)) operation (and/or D2D UEs performing only D2D communication (transmission (/reception)) operation.

A rule may also be defined so that the proposed methods above are applied to be limited to a scenario supporting (configured for) only D2D discovery (and/or a scenario supporting (configured for) only D2D communication).

A rule may also be defined so that the proposed methods above are applied to be limited to the case in which D2D discovery signal reception operation is performed on a different (UL) carrier based on inter-frequency scheme (and/or the case in which D2D discovery signal reception operation is performed on a different PLMN (UL) carrier based on inter-PLMN scheme).

Figure 18:
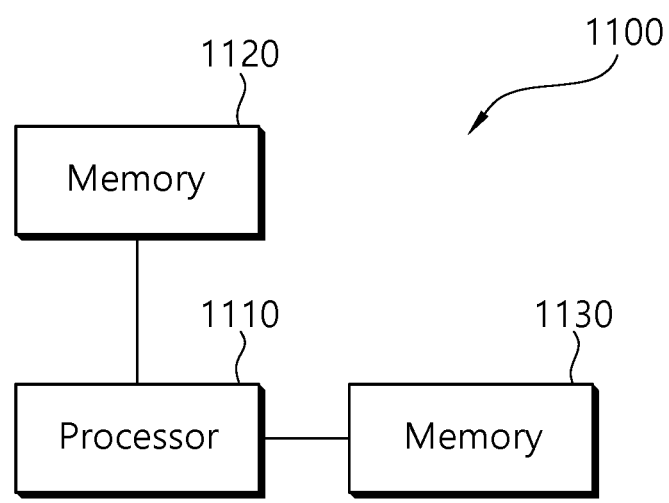
FIG. 18 is a block diagram of a UE in which an embodiment of the present invention is implemented.

FIG. 18 is a block diagram of a UE in which an embodiment of the present invention is implemented.

Referring to FIG. 18, a UE 1100 comprises a processor 1110, a memory 1120, and an RF (Radio Frequency) unit 1130. The processor 1110 implements the proposed functions, processes and/or methods. For example, when a plurality of channel/signal transmission (or reception) is performed on a plurality of carriers simultaneously, the processor 1110 may determine priorities to be applied to the channel/signal transmission (or reception). Also, the processor 1110 may be configured to perform D2D channel/signal transmission (or reception) according to the priorities.

The RF unit 1130, being connected to the processor 1110, transmits and receives a radio signal.

The processor may comprise ASIC (Application-Specific Integrated Circuit), other chipsets, logical circuit and/or data processing devices. The memory may comprise ROM (Read-Only Memory), RAM (Random Access Memory), flash memory, memory card, storage medium and/or other storage devices. The RF unit may include a baseband circuit for processing a radio signal. When an embodiment is implemented by software, the methods described above may be implemented by modules (processes or functions) performing the functions described above. A module may be stored in the memory and executed by the processor. The memory may be installed inside or outside the processor and may be connected to the processor via various well-known means.

What is claimed is:

1. A method for performing a first Device-to-Device (D2D) operation and a second D2D operation in a wireless communication system, the method performed by a user equipment (UE) and comprising:
    determining priorities of the first D2D operation and the second D2D operation when the first D2D operation is performed on a first carrier and the second D2D operation is performed on a second carrier simultaneously; and
    performing the first D2D operation and the second D2D operation simultaneously in a same time domain based on the priorities,
    wherein a first coverage status of the UE on the first carrier is different from a second coverage status of the UE on the second carrier, and
    wherein, when the first coverage status is in-coverage, the second coverage status is out-of-coverage, and
    when the first coverage status is the out-of-coverage, the second coverage status is the in-coverage.

2. The method of claim 1, wherein the UE determines the priorities based on at least one of a signal type based priority or a carrier type based priority.

3. The method of claim 2, wherein the UE determines the priorities based on the signal type based priority rather than the carrier type based priority.

4. The method of claim 3, wherein the UE receives information informing that the signal type based priority is applied rather than the carrier type based priority when the UE determines the priorities.

5. The method of claim 2, wherein the UE determines the priorities based on the carrier type based priority rather than the signal type based priority.

6. The method of claim 5, wherein the UE receives information informing that the carrier type based priority is applied rather than the signal type based priority when the UE determines the priorities.

7. A user equipment (UE), comprising:
    a transceiver configured to transmit and receive a radio signal; and
    a processor operating in association with the transceiver, wherein the processor is configured to:
        determine priorities of a first Device-to-Device (D2D) operation and a second D2D operation when the first D2D operation is performed on a first carrier and the second D2D operation is performed on a second carrier simultaneously; and
        perform the first D2D operation and the second D2D operation simultaneously in a same time domain based on the priorities,
    wherein a first coverage status of the UE on the first carrier is different from a second coverage status of the UE on the second carrier, and
    wherein, when the first coverage status is in-coverage, the second coverage status is out-of-coverage, and
    when the first coverage status is the out-of-coverage, the second coverage status is the in-coverage.

* * * * *